(12) United States Patent
Amador et al.

(10) Patent No.: US 11,236,636 B2
(45) Date of Patent: Feb. 1, 2022

(54) OIL-COOLED CARBON SEAL

(71) Applicant: United Technologies Corporation, Farmington, CT (US)

(72) Inventors: Armando Amador, Wethersfield, CT (US); Todd A. Davis, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 624 days.

(21) Appl. No.: 16/173,500

(22) Filed: Oct. 29, 2018

(65) Prior Publication Data

US 2020/0131936 A1    Apr. 30, 2020

(51) Int. Cl.
*F01D 25/18*    (2006.01)
*F01D 25/20*    (2006.01)
*F02C 7/28*     (2006.01)
*F16J 15/34*    (2006.01)

(52) U.S. Cl.
CPC .......... *F01D 25/183* (2013.01); *F01D 25/20* (2013.01); *F02C 7/28* (2013.01); *F16J 15/3404* (2013.01)

(58) Field of Classification Search
CPC ..... F16J 15/3404; F01D 25/183; F01D 25/20; F02C 7/28
See application file for complete search history.

(56) References Cited

U.S. PATENT DOCUMENTS

| 3,578,343 A * | 5/1971 | Taschenberg ........ F16J 15/3456 277/399 |
| 4,314,705 A * | 2/1982 | Shimizu ................. F16J 15/004 277/346 |
| 4,406,459 A * | 9/1983 | Davis ................... F16J 15/3404 277/401 |
| 4,928,978 A * | 5/1990 | Shaffer ................. F01D 25/183 277/401 |
| 6,099,243 A * | 8/2000 | Fiore .................... F16J 15/3404 415/111 |
| 7,861,530 B2 | 1/2011 | Hawie et al. |
| 9,719,373 B2 | 8/2017 | Maret et al. |
| 10,352,456 B2 * | 7/2019 | Amador ................. F16J 15/342 |
| 2009/0189355 A1 * | 7/2009 | Ueda ....................... F16J 15/342 277/350 |

(Continued)

FOREIGN PATENT DOCUMENTS

| EP | 3382240 A1 | 10/2018 |
| EP | 3385511 A2 | 10/2018 |

OTHER PUBLICATIONS

European Search Report dated Mar. 19, 2020 for European Patent Application No. 19206047.3.

*Primary Examiner* — Kristina R Fulton
*Assistant Examiner* — L. Susmitha Koneru
(74) *Attorney, Agent, or Firm* — Bachman & LaPointe, P.C.

(57) ABSTRACT

A seal system has: a first member; a seal carried by the first member and having a seal face; and a second member rotatable relative to the first member about an axis. The second member has: a seat, the seat having a seat face in sliding sealing engagement with the seal face; and a circumferential array of passageway legs. The second member further has an annular channel axially spaced from the seat face, the passageway legs connected to the annular channel.

20 Claims, 5 Drawing Sheets

(56) References Cited

U.S. PATENT DOCUMENTS

| | | | |
|---|---|---|---|
| 2014/0140824 A1* | 5/2014 | Sheridan | F01D 25/16 415/170.1 |
| 2017/0051632 A1* | 2/2017 | Lefebvre | F16C 33/6659 |
| 2018/0045316 A1* | 2/2018 | Kovacik | F16J 15/324 |
| 2018/0087404 A1* | 3/2018 | Lighty | F01D 11/003 |
| 2020/0132196 A1* | 4/2020 | Davis | F01D 11/003 |

* cited by examiner

OIL-COOLED CARBON SEAL

BACKGROUND

The disclosure relates to gas turbine engines. More particularly, the disclosure relates to cooling of carbon seals in gas turbine engines.

Carbon seals are commonly used to seal between relatively rotating components in gas turbine engines. In typical situations, the annular carbon seal is spring biased into engagement with an annular seat (typically metallic such as a steel). Often, the carbon seal is on non-rotating static structure and the seat rotates with one of the engine shafts. The sliding engagement causes frictional heating. The heat must be dissipated. With a rotating seat, it is common to use oil cooling. Generally, oil-cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both forms of seals, the oil may be delivered through a nozzle and slung radially outward by the rotating component and collected in a radially outwardly closed and inwardly open collection channel from which the passageways extend further radially outward.

U.S. Pat. No. 4,406,459 (the '459 patent), Davis et al., Sep. 27, 1983, "Oil Weepage Return for Carbon Seal Plates" shows a seal with two sets of passageways through the seat. One set delivers oil to the interface as a wet face seal. Another set helps centrifugally pump out oil that has weeped radially inward from the interface.

U.S. Pat. No. 4,928,978 (the '978 patent), Shaffer et al., May 29, 1990, "Rotating shaft seal" shows an alternative wet face seal.

United States Patent Application Publication 20180045316A1 (the '316 publication), Kovacik et al., Feb. 15, 2018, "Hydrodynamic Seal Seat Cooling Features" shows a dry face seal wherein the oil passageways have two legs: an upstream leg receiving oil from a collection notch which in turn has collected the oil from a nozzle; and a downstream leg extending radially outward from the upstream leg generally close to and parallel to the sealing interface.

SUMMARY

One aspect of the disclosure involves a seal system comprising: a first member; a seal carried by the first member and having a seal face; and a second member rotatable relative to the first member about an axis. The second member has: a seat, the seat having a seat face in sliding sealing engagement with the seal face; and a circumferential array of passageway legs. The second member further has an annular channel axially spaced from the seat face, the passageway legs connected to the annular channel.

A further embodiment of any of the foregoing embodiments may additionally and/or alternatively include the seal being a carbon seal.

A further embodiment of any of the foregoing embodiments may additionally and/or alternatively include the seat being steel and/or the seat and seal being full annular.

A further embodiment of any of the foregoing embodiments may additionally and/or alternatively include along a radial span of the seat face, the annular channel being spaced by 1.0 mm to 6.0 mm from the seat face.

A further embodiment of any of the foregoing embodiments may additionally and/or alternatively include the annular channel fully radially overlapping a contact area of the seat face and seal face.

A further embodiment of any of the foregoing embodiments may additionally and/or alternatively include the annular channel having a first surface axially diverging from the seat face in an outward radial direction.

A further embodiment of any of the foregoing embodiments may additionally and/or alternatively include the annular channel having a second surface axially diverging from the first surface in an outward radial direction.

A further embodiment of any of the foregoing embodiments may additionally and/or alternatively include the second surface axially diverging from the first surface in the outward radial direction by $1.0°$ to $10.0°$.

A further embodiment of any of the foregoing embodiments may additionally and/or alternatively include the first surface axially diverging from the seat face in the outward radial direction by $2.0°$ to $8.0°$.

A further embodiment of any of the foregoing embodiments may additionally and/or alternatively include: the passageway legs and the annular channel being in a first piece; a second piece encircling and being attached to the first piece; and the second piece having a circumferential array of apertures and cooperating with the first piece to define a plenum extending from the annular channel.

A further embodiment of any of the foregoing embodiments may additionally and/or alternatively include the second piece circumferential array of apertures being axially offset from the annular channel in a direction away from the seal.

A further embodiment of any of the foregoing embodiments may additionally and/or alternatively include the second piece being attached to the first piece via interference fit or braze.

A further embodiment of any of the foregoing embodiments may additionally and/or alternatively include: the passageway legs and the annular channel being in a first piece; the first piece having a radially inwardly open annular second channel; a second piece being accommodated partially second channel; and the first piece and second piece combine to form an radially outwardly closed collection channel for collecting centrifuged oil to pass into the passageway legs.

A further embodiment of any of the foregoing embodiments may additionally and/or alternatively include an oil source positioned to introduce oil to the passageway legs.

A further embodiment of any of the foregoing embodiments may additionally and/or alternatively include the seal system being a dry face seal.

A further embodiment of any of the foregoing embodiments may additionally and/or alternatively include a gas turbine engine including the seal system and/or wherein the second member is a shaft.

A further embodiment of any of the foregoing embodiments may additionally and/or alternatively include the seal system further comprising an oil source positioned to introduce oil to the passageway legs.

A further embodiment of any of the foregoing embodiments may additionally and/or alternatively include a method for using the seal system. The method comprises: relatively rotating the second member to the first member about the axis; the rotation centrifugally driving a flow of oil through the passageway legs and from the passageway legs through the annular channel; and the oil passing through the annular channel cooling the seat face.

A further embodiment of any of the foregoing embodiments may additionally and/or alternatively include spraying the oil from a nozzle.

A further embodiment of any of the foregoing embodiments may additionally and/or alternatively include the sprayed oil being centrifugally collected in a radially outwardly closed channel from which the passageway legs extend.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
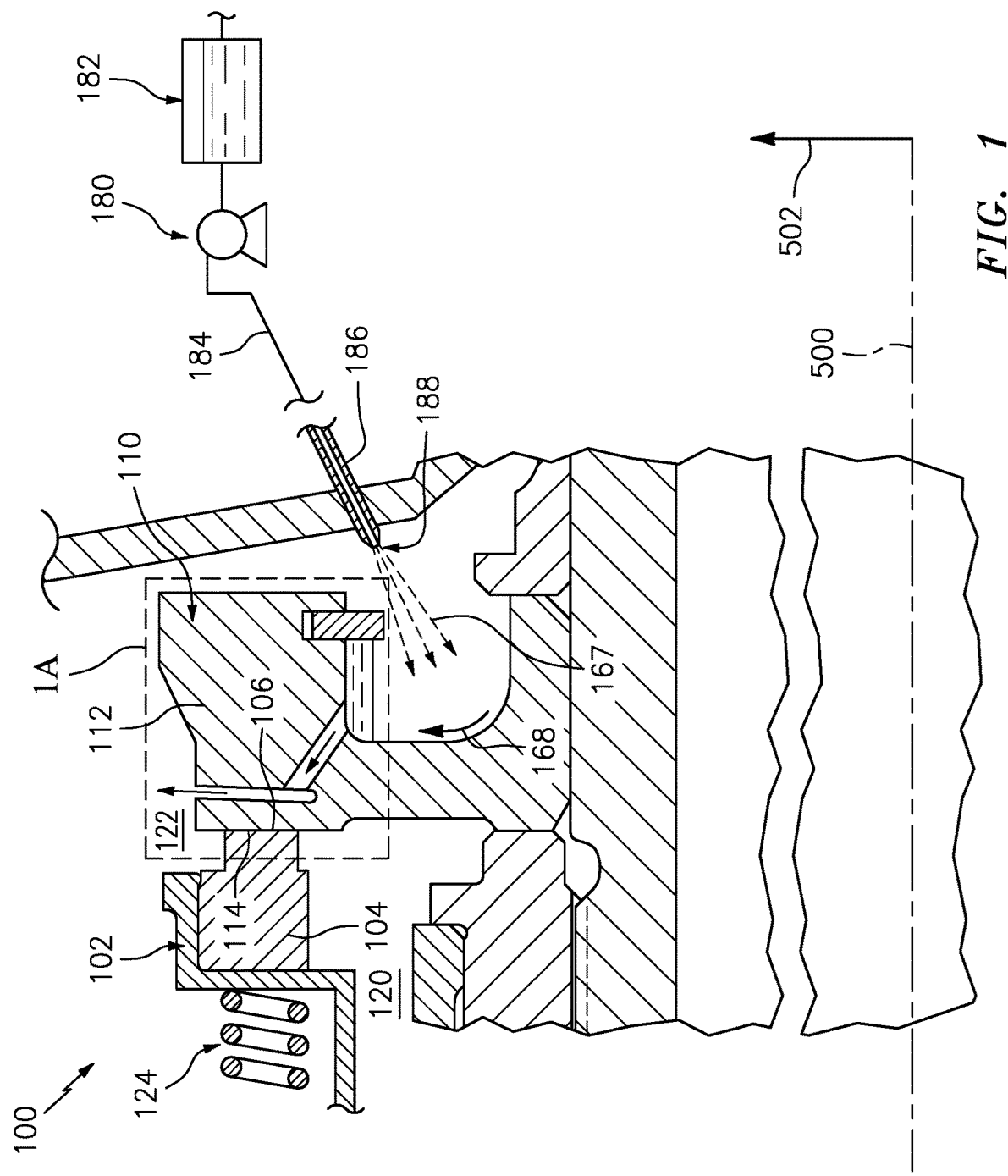
FIG. 1 is a partial partially schematic central axial sectional view of a first seal system.

FIG. 1 shows a seal system 100 having a first member 102 carrying a seal 104. The exemplary seal 104 is a carbon seal having a seal surface or face 106. The exemplary seal 104 is formed as a body of revolution about an axis 500 which is an axis of relative rotation between the first member 102 and a second member 110. FIG. 1 further shows an outward radial direction 502. The exemplary seal face 106 is a radial face. The second member 110 comprises a piece 112 (seat piece) forming a seat for the seal with a seat surface or face 114 in sliding sealing engagement with the seal face 106 at a sealing interface.

The exemplary illustrated configuration is a dry face configuration. The seal 104 may be biased into axially compressive engagement with the seat face 114 via one or more factors including pressure bias and spring loading. The seal 104 is shown as sealing a space or region 120 inboard of the sealing interface from a space or region 122 outboard. Depending upon configuration, the pressure difference may bias the seal in either direction. FIG. 1 further shows a spring 124 (e.g., a coil spring) providing the required bias. There may be a circumferential array of such springs about the axis 500 each under axial compression.

In one group of examples discussed below, the second member 110 is rotating in an inertial frame of reference while the first member 102 is either stationary or counter-rotating. The rotating of the second member 110 may create a centrifugal oil flow action discussed further below.

Figure 1A:
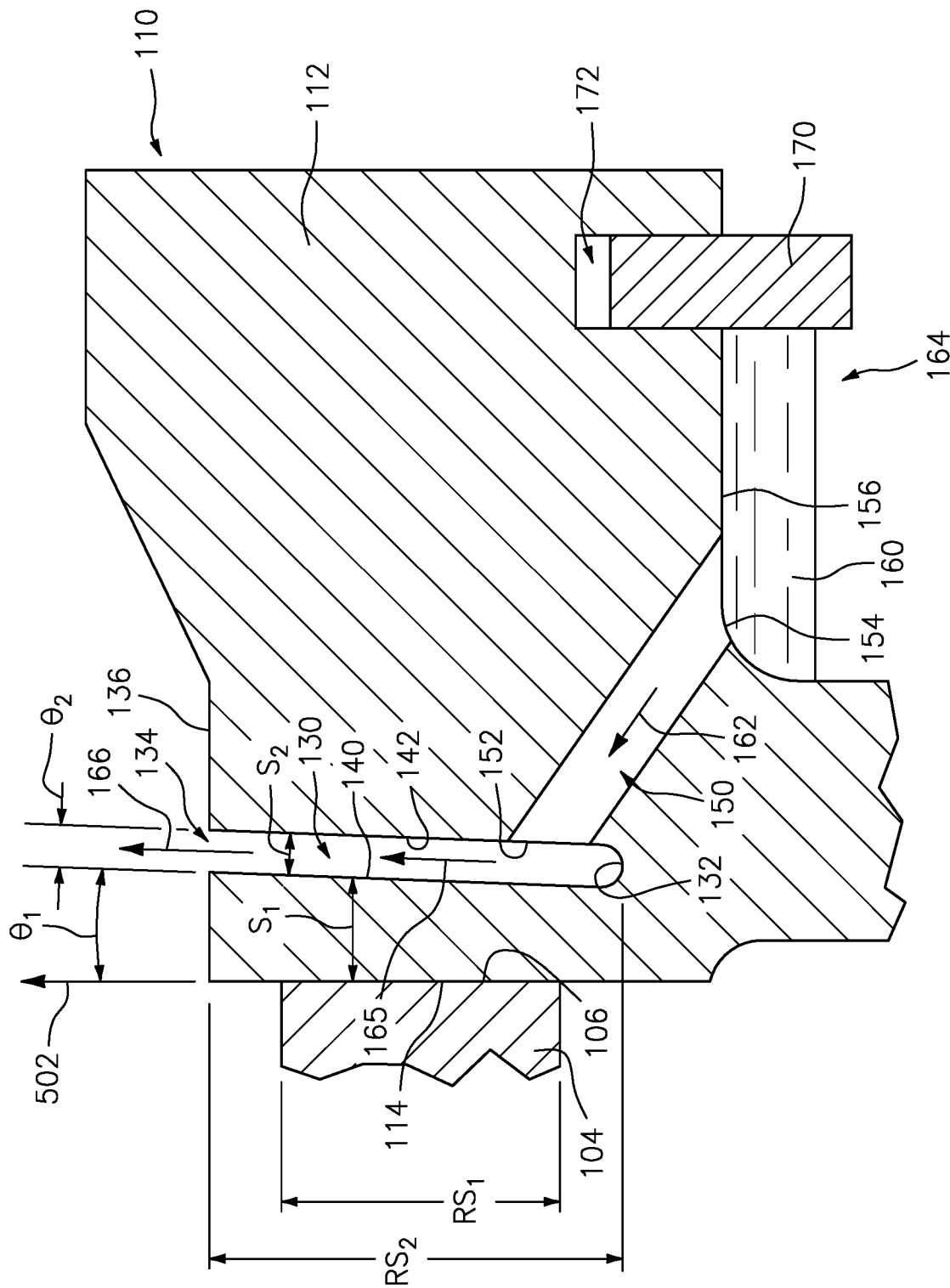
FIG. 1A is an enlarged view of a sealing interface area of the seal system of FIG. 1.

In operation, the relative rotation produces frictional heating at the sliding interface between the faces 106 and 114. Cooling to dissipate this heat is therefore desirable. As discussed above, it is well-known to provide a circumferential array of oil flow passages through a seat. These are typically drilled after machining gross features of the seat. FIG. 1A, however, shows the seat piece 112 as having an annular channel 130 axially spaced from the seat face 114.

The exemplary annular channel extends from a radially inboard inner diameter (ID) base 132 to a radially outboard outer diameter (OD) opening 134 in an OD surface 136 of the seat piece 112. The channel 130 also has a first surface or face 140 and a second surface or face 142 axially spaced therefrom. The channel 130 may be machined in the piece 112 by conventional methods, such as turning or milling, or advanced methods, such as EDM.

FIG. 1A further shows a circumferential array of passageway legs (passageways) 150 connected to the annular channel 130 at respective first ends 152 and open to a surface portion 156 of the piece 112 at their second ends 154. An exemplary number of passageways 150 is 10 to 100, more particularly 20 to 80 or 25 to 55 in seal sizes used on gas turbine engines. In operation, centrifugal action causes an accumulation 160 of oil to be captured by the second member 110 in a radially outwardly closed collection channel 164. The passageway second ends 154 form outlets from the collection channel allowing oil flows 162 to pass outward through the passageways to the channel 130. The flows 162 from the individual passageways 150 merge to form a flow 165 in the channel 130. The flow 165 flows radially outward to be discharged as a discharge flow 166. The radial oil flow 165 in the channel cools the seat piece 112 and, thereby, cools the seat face and seal face.

To form the channel 164, FIG. 1A shows a weir formed by an annular member 170 accommodated partially in a radially inwardly open channel 172 in the seat piece 112. A portion of the member 170 protrudes radially inwardly from an opening of the channel 172 at the surface 156. As an oil source, FIG. 1 shows an oil pump 180 delivering oil from a reservoir 182 via a conduit 184. The conduit 184 may terminate at one or more nozzles 186. Each nozzle may have a respective outlet 188 discharging a spray 167 of the oil. The sprayed oil collects on a surface of the first member and is slung radially outward as a flow 168 (FIG. 1) to the channel 164. Oil from the flow 166 may be collected and returned to the reservoir 182 by a conventional collection apparatus (not shown).

FIG. 1A further shows the seat face 106 having a radial span $RS_1$ and the channel 130 as having a radial span $RS_2$. The exemplary radial spans are oriented so that the channel 130 fully radially overlaps the seal face 106. This provides a short thermal conductive flowpath for heat to pass from the seat face 114 to the flow 165 in the channel 130. FIG. 1A further shows an angle $\theta_1$ between the seal face/seat face on the one hand and the adjacent channel face 140 on the other hand. Exemplary $\theta_1$ is greater than zero. More particularly, with the seal face extending exactly or close to exactly radially, the adjacent portion of the channel face 140 diverges at the angle $\theta_1$ in the radial outward direction. This divergence from radial helps cause the flow 165 to remain attached to the face 140. The opposite inclination would potentially risk flow separation and loss of heat conduction. Exemplary $\theta_1$, however, may be fairly small in order to maintain cooling effectiveness as the flow 165 progresses radially outward toward the outer diameter (OD) extent of the seal face. Thus, exemplary $\theta_1$ is 0-30.0°, more particularly, 0-12.0°, 0.5-10.0°, or 1.0-10.0° or 2.0-8.0°. The second face 142 may similarly diverge from the first face at an angle $\theta_2$. But this divergence $\theta_2$ may represent an artifact of manufacturing such as from a tapered bit. Exemplary $\theta_2$ is 0° to 30.0°, more particularly 0° to 15.0° or 0° to 10.0° or 0° to 5.0°. Alternative lower ends on those ranges are 1.0° and 3.0°. Exemplary span $S_1$ between the seat face 114 and the channel face 140 is 0.030 inch to 0.250 inch (0.76 mm to 6.35 mm), more narrowly 2.0 mm to 6.0 mm or 2.5 mm to 5.0 mm. Exemplary channel width $S_2$ is 0.030 inch to 0.250 inch (0.76 mm to 6.35 mm), more narrowly 1.0 mm to 6.0 mm or 2.0 mm to 6.0 mm or 2.5 mm to 5.0 mm.

An exemplary member 170 may be formed by spiral winding such as used for retaining rings. Alternatively, a weir may be integrally machined into seat piece 112.

In various implementations, the use of the annular channel 130 may have one or more of several advantages relative to any particular baseline. For example, when contrasted with a baseline arrangement as in the '316 publication, the channel 130 may provide more circumferential uniformity of cooling which may help reduce heat generation and wear. For example, discrete passages may produce a circumferential array of cool zones interspersed with warmer zones. The differential thermal expansion of cool portions of the seat and hot portions of the seat may produce an uneven seat surface generating unnecessary heat and potentially compromising sealing.

Figure 2:
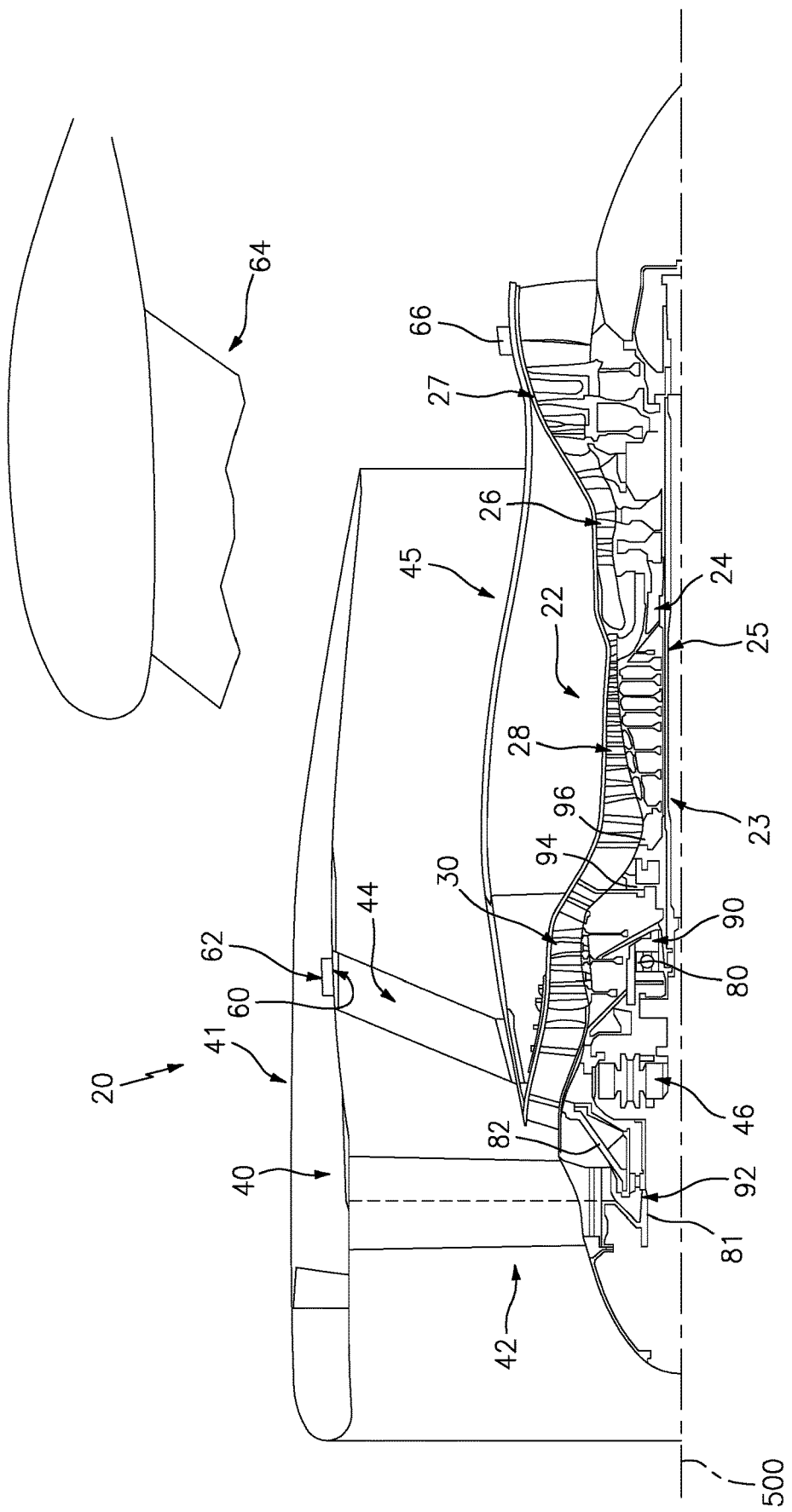
FIG. 2 is a partially schematic central axial sectional view of a gas turbine engine.

FIG. 2 shows a turbofan engine 20 having an engine case 22 containing a rotor shaft assembly 23. An exemplary engine is a turbofan. Alternatives include turbojets, turboprops, turboshafts, and industrial gas turbines. The exemplary turbofan is a two-spool turbofan. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle 41 around the fan case is shown and an aerodynamic nacelle 45 around the engine case is shown.

Although a two spool (plus fan) engine is shown, an alternative variation involves a three spool (plus fan) engine wherein an intermediate spool comprises an intermediate pressure compressor (IPC) between the LPC and HPC and an intermediate pressure turbine (IPT) between the HPT and LPT. In another aspect a three-spool engine, the IPT drives a low pressure compressor while the LPT drives a fan, in both cases either directly or indirectly via a transmission mechanism, for example a gearbox.

In the exemplary embodiment, the low shaft portion 25 of the rotor shaft assembly 23 drives the fan 42 through a reduction transmission 46. An exemplary reduction transmission is an epicyclic transmission, namely a planetary or star gear system.

FIG. 2 also shows at their outboard ends, the vanes 44 have flanges 60 bolted to an inner ring structure of the fan case to tie the outboard ends of the vanes together. Integral therewith or fastened thereto is a forward mounting structure 62 (e.g., clevises which form part of a four bar mechanism) and provides forward support to the engine (e.g., vertical and lateral support). To mount the engine to the aircraft wing, a pylon 64 is mounted to the structure 62 (e.g., forming the outer part thereof). The pylon is also mounted to a rear engine mount 66.

In one example, FIG. 2 shows a location 90 for the seal system 100 wherein the first member 102 may be mounted to (or integrally formed with) a static bearing support 80 and the second member 110 may be mounted to (or integrally formed with) a forward portion of the low shaft 25. Alternatively, in a location 92, the first member 102 may be mounted to (or integrally formed with) a static hub 82 and the second member 110 mounted to (or integrally formed with) a fan shaft 81. In these two illustrated examples, the seal system is positioned adjacent one end of a bearing system to isolate the bearing system. Similar locations may be provided for other bearings in the engine. For example, locations 94 and 96 may represent locations where the sealing is between the high spool and static structure on either side of a bearing supporting the high spool.

Figure 3:
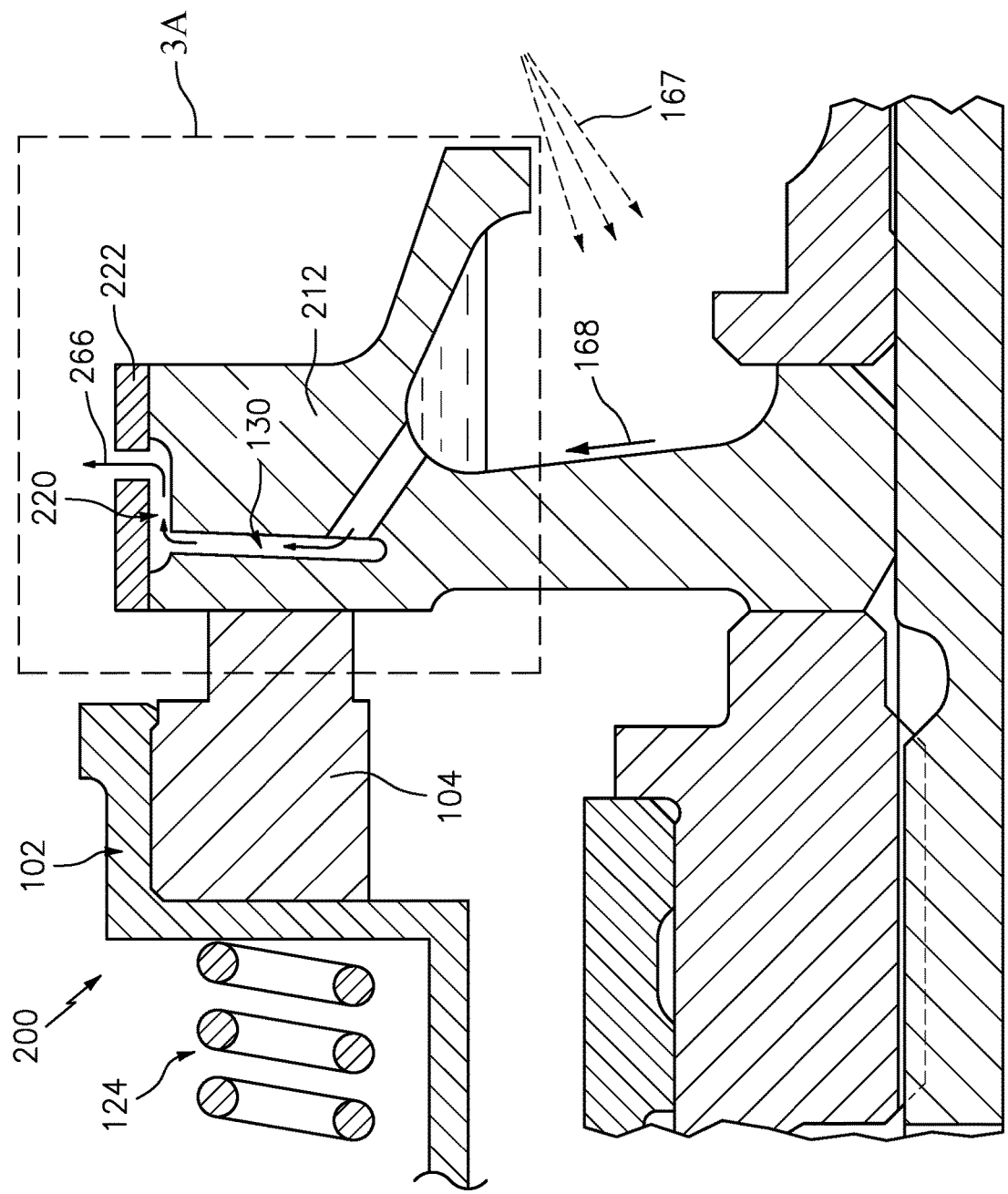
FIG. 3 is a partial partially schematic central axial sectional view of a second seal system.
Figure 3A:
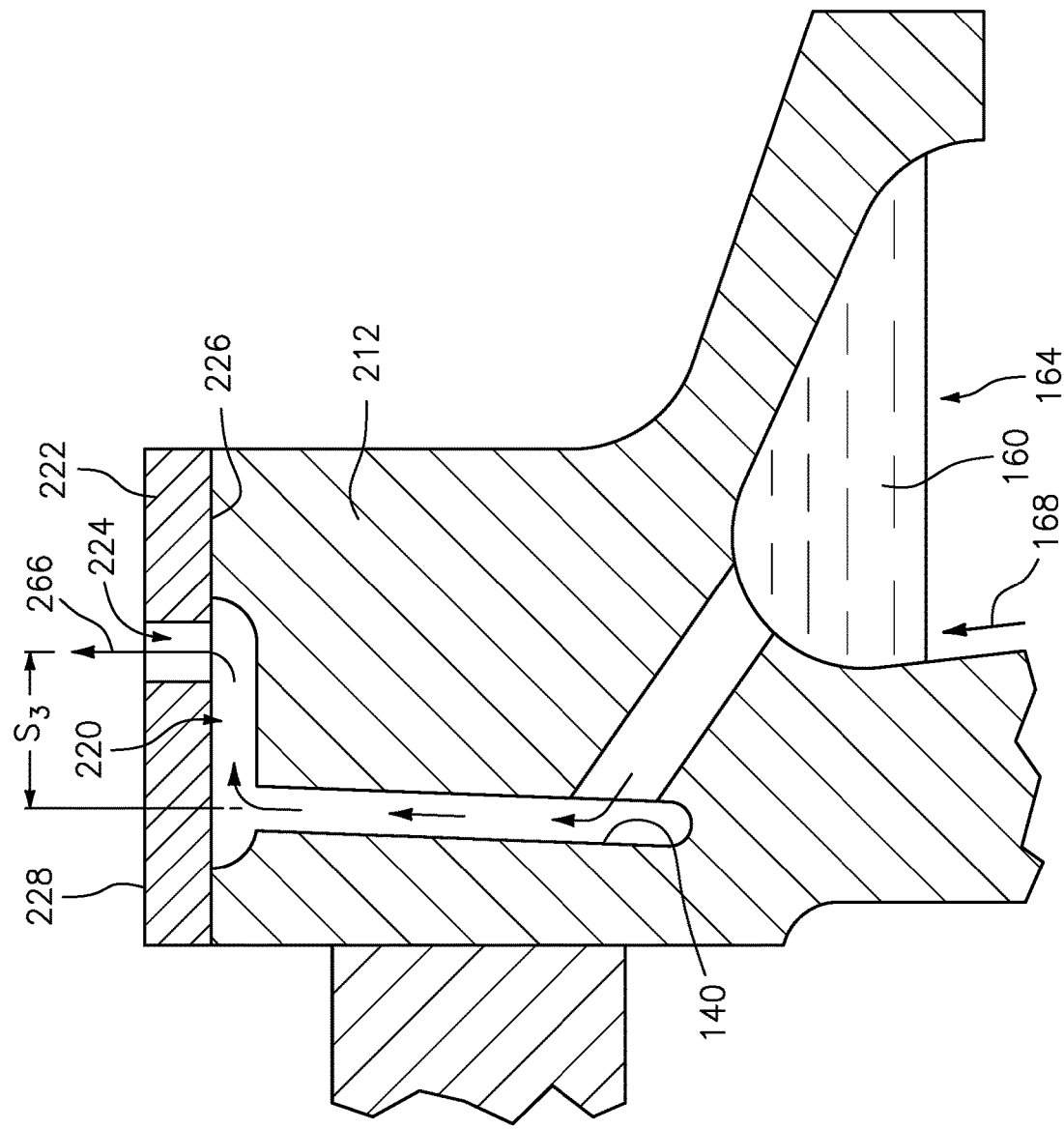
FIG. 3A is an enlarged view of a sealing interface area of the second seal system of FIG. 3.

FIG. 3 shows an alternate seal system 200 configuration, otherwise similar to FIG. 1 with several exceptions. A first exception is that the cooling channel 130 extends radially outward to a plenum 220 (FIG. 3A). The plenum 220 is defined by the combination of: a further annular channel in a first seat piece 212; and a second piece 222 encircling and attached to the first piece. The exemplary second piece 222 is formed as an annular sleeve having a circumferential array of apertures 224 extending between an inner diameter (ID) surface 226 and an outer diameter (OD) surface 228. The ID surface is engaged to the OD surface of the first seat piece 212 fore and aft of the plenum 220 (e.g., via interference fit or a braze joint). Alternative configurations may have the second piece 222 as nondestructively removable from the first piece such as via a retaining clip or wire (e.g. snap ring). Similarly, in such removable configurations, separate seals may be provided between the pieces (e.g., O-rings).

The apertures 224 are axially offset from the outer diameter opening of the channel 130 to the plenum 220. An exemplary number of apertures 224 is 10 to 100, more particularly 20 to 80 or 25 to 55 in seal sizes used on gas turbine engines. The plenum 220 and apertures 224 may provide one or more of several functions. First, the apertures may provide a metering function (metering/restricting discharge flows 266) helping ensure the flow has sufficient residence time in the channel 130 to not separate from the face 140 and to provide sufficient cooling. Additionally, residence time in the plenum 220 may further cool the first seat piece 212 to maximize the cooling. The axial offset of the apertures 224 from the outlet or OD end of the channel 134 helps ensure that flow is along the length of the plenum 220 to again maximize cooling efficiency. Exemplary offset $S_3$ (measured center-to-center) is 0.00 inches to 0.50 inches (0.0 mm to 12.7 mm), more particularly, 0.00 inches to 0.30 inches (0.0 mm to 7.6 mm) or, for non-zero values 0.10 inch to 0.30 inch (2.5 mm to 7.6 mm) or 0.10 inch to 0.50 inch (2.5 mm to 12.7 mm).

A further difference between the FIG. 3 and FIG. 1 systems is the FIG. 3 presence of an integral weir formed in the first piece. This may be more representative of conventional weirs.

Additional variations include seals where the oil is not delivered from a spray nozzle, but instead passes outward from a plenum (e.g., as in the '459 and '978 patents above) or via other means.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline seal or machine configuration, details of such baseline may influence details of particular implementations. Accordingly, other embodiments are within the scope of the following claims.

What is claimed is:

1. A seal system comprising:
a first member;
a seal carried by the first member and having a seal face; and
a second member rotatable relative to the first member about an axis and having:
a seat, the seat having a seat face in sliding sealing engagement with the seal face; and
a circumferential array of passageway legs,
wherein:
the second member further comprises an annular channel axially spaced from the seat face, the passageway legs connected to the annular channel:
the passageway legs and the annular channel are in a single piece;
the annular channel has a first surface axially diverging from the seat face in an outward radial direction; and
the annular channel has a second surface axially diverging from the first surface in an outward radial direction 1.0° to 10.0°.

2. The seal system of claim 1 wherein:
the seal is a carbon seal.

3. The seal system of claim 1 wherein:
the seat is steel; and
the seat and seal are full annular.

4. The seal system of claim 1 wherein:
along a radial span of the seat face, the annular channel is spaced by 1.0 mm to 6.0 mm from the seat face.

5. The apparatus of claim 1 wherein:
the annular channel fully radially overlaps a contact area of the seat face and seal face; and
the annular channel second surface axially diverges from the first surface in the outward radial direction in a region of said radial overlap.

6. The seal system of claim 1 wherein:
the first surface axially diverges from the seat face in the outward radial direction by 2.0° to 8.0°.

7. The seal system of claim 1 wherein:
the single piece is a first piece;
a second piece encircles and is attached to the first piece; and
the second piece has a circumferential array of apertures and cooperates with the first piece to define a plenum extending from the annular channel.

8. The seal system of claim 7 wherein:
the second piece is formed as an annular sleeve having a circumferential array of apertures extending between an inner diameter surface of the second piece and an outer diameter surface second piece;
an inner diameter surface of the second piece is engaged to an outer diameter surface of the first seat piece fore and aft of the plenum; and
the second piece circumferential array of apertures are axially offset from the annular channel in a direction away from the seal.

9. The seal system of claim 7 wherein:
the second piece is attached to the first piece via interference fit or braze.

10. The seal system of claim 1 wherein:
the single piece is a first piece;
the passageway legs and the annular channel are in the first piece;
the first piece has a radially inwardly open annular second channel;
a second piece is accommodated partially in the second channel; and
the first piece and second piece combine to form an radially outwardly closed collection channel for collecting centrifuged oil to pass into the passageway legs.

11. The seal system of claim 1 further comprising:
an oil source positioned to introduce oil to the passageway legs.

12. The seal system of claim 1 being a dry face seal.

13. A gas turbine engine including the seal system of claim 1 wherein:
the second member is a shaft.

14. The gas turbine engine of claim 13 wherein the seal system further comprises:
an oil source positioned to introduce oil to the passageway legs.

15. A method for using the seal system of claim 1, the method comprising:
relatively rotating the second member to the first member about the axis;
the rotation centrifugally driving a flow of oil through the passageway legs and from the passageway legs through the annular channel; and
the oil passing through the annular channel cooling the seat face.

16. The method of claim 15 further comprising:
spraying the oil from a nozzle.

17. The method of claim 16 wherein:
the sprayed oil is centrifugally collected in a radially outwardly closed channel from which the passageway legs extend.

18. A seal system comprising: a first member; a seal carded by the first member and having a seal face; and a second member rotatable relative to the first member about an axis and having: a seat, the seat having a seat face in sliding sealing engagement with the seal face; and a circumferential array of passageway legs, wherein: the second member further comprises an annular channel axially spaced from the seat face, the passageway legs connected to the annular channel; the passageway legs and the annular channel are in a first piece which is a single piece; the first piece has a radially inwardly open annular second channel; a second piece is accommodated partially in the second channel; and the first piece and second piece combine to form a collection channel for collecting centrifuged oil to pass into the passageway legs.

19. The seal system of claim 18 wherein:
the annular second channel is radially inwardly open;
a portion of the second piece protrudes radially inward from an opening of the annular second channel.

20. The seal system of claim 18 wherein: the second piece is a spiral winding.

* * * * *